(12) United States Patent
Domoto

(10) Patent No.: US 8,925,888 B2
(45) Date of Patent: Jan. 6, 2015

(54) SEAT SLIDE LOCKING APPARATUS

(75) Inventor: Yasuhito Domoto, Fuchu-cho (JP)

(73) Assignee: Delta Kogyo Co., Ltd., Hiroshima (JP)

( * ) Notice: Subject to any disclaimer, the term of this patent is extended or adjusted under 35 U.S.C. 154(b) by 266 days.

(21) Appl. No.: 13/478,191

(22) Filed: May 23, 2012

(65) Prior Publication Data

US 2012/0299361 A1 Nov. 29, 2012

(30) Foreign Application Priority Data

May 27, 2011 (JP) ................................. 2011-118947

(51) Int. Cl.
- *F16M 13/00* (2006.01)
- *B60N 2/07* (2006.01)
- *B60N 2/08* (2006.01)

(52) U.S. Cl.
CPC ............ *B60N 2/0705* (2013.01); *B60N 2/0715* (2013.01); *B60N 2/0818* (2013.01); *B60N 2/0875* (2013.01)
USPC ........ 248/429; 248/430; 248/424; 296/65.13; 297/344.1

(58) Field of Classification Search
USPC ............ 248/429, 430, 424, 503.1; 296/65.09, 296/65.13, 65.14; 297/344.1, 341, 340, 297/344.11
See application file for complete search history.

(56) References Cited

U.S. PATENT DOCUMENTS

| | | | | |
|---|---|---|---|---|
| 4,712,759 A * | 12/1987 | Sugama et al. | ............... | 248/429 |
| 5,234,189 A * | 8/1993 | Myers | ........................... | 248/429 |
| 5,560,262 A * | 10/1996 | Orzech | ........................... | 74/527 |
| 5,564,315 A * | 10/1996 | Schuler et al. | .................. | 74/527 |
| 5,596,910 A * | 1/1997 | Bauer et al. | ..................... | 74/526 |
| 5,782,138 A * | 7/1998 | Groche | ........................... | 74/527 |
| 5,816,110 A * | 10/1998 | Schuler et al. | .................. | 74/527 |
| 5,913,947 A * | 6/1999 | Groche | ........................... | 74/527 |
| 6,308,589 B1 * | 10/2001 | Schuler et al. | .................. | 74/538 |
| 6,322,036 B1 * | 11/2001 | Tame et al. | .................... | 248/429 |
| 6,637,712 B1 * | 10/2003 | Lagerweij | ..................... | 248/429 |
| 6,764,054 B2 * | 7/2004 | Becker et al. | ................. | 248/429 |
| 6,892,995 B2 * | 5/2005 | Tame et al. | .................... | 248/429 |
| 7,207,541 B2 * | 4/2007 | Frohnhaus et al. | ........... | 248/429 |
| 7,661,646 B2 * | 2/2010 | Weber | ........................... | 248/429 |
| 7,722,006 B2 * | 5/2010 | Beneker et al. | ................ | 248/424 |
| 7,905,461 B2 * | 3/2011 | Noffz | ............................. | 248/429 |
| 7,980,525 B2 * | 7/2011 | Kostin | ........................... | 248/429 |
| 8,029,063 B2 * | 10/2011 | Kazyak et al. | ............. | 297/344.1 |

(Continued)

FOREIGN PATENT DOCUMENTS

JP 47-39764 12/1972

*Primary Examiner* — Terrell McKinnon
*Assistant Examiner* — Monica Millner
(74) *Attorney, Agent, or Firm* — Gerald E. Hespos; Michael J. Porco; Matthew T. Hespos

(57) ABSTRACT

A slide locking apparatus has: a first locking piece having a narrow width locking hook section, a third locking piece having a broad width locking hook section and a second locking hook having an intermediate width locking hook section, which are held on an upper aril; and first to third locking piece accommodating holes which have width corresponding to the widths of the respective locking hook sections of the first locking piece to the third locking piece, and which are provided in a lower rail. The first locking piece accommodating hole is disposed on a frontmost end, the second locking piece accommodating hole is disposed to the rear side of the first locking piece accommodating hole, and the third locking piece accommodating holes are disposed to the rear side of the second locking piece accommodating hole.

7 Claims, 14 Drawing Sheets

(56) References Cited

U.S. PATENT DOCUMENTS

| | | |
|---|---|---|
| 8,376,460 B2 * | 2/2013 | Nadgouda et al. ....... 297/344.11 |
| 8,382,057 B2 * | 2/2013 | Napau et al. .................. 248/423 |
| 2002/0079418 A1 | 6/2002 | Tame et al. |
| 2003/0164434 A1 * | 9/2003 | Frohnhaus et al. ........... 248/430 |
| 2004/0026975 A1 * | 2/2004 | Rausch et al. ............. 297/344.1 |
| 2006/0261237 A1 * | 11/2006 | Noffz ............................ 248/424 |
| 2008/0163717 A1 * | 7/2008 | Weber ............................ 74/527 |
| 2008/0315662 A1 * | 12/2008 | Suck et al. ................. 297/463.1 |
| 2009/0322136 A1 * | 12/2009 | Kazyak et al. ............. 297/344.1 |
| 2010/0102192 A1 * | 4/2010 | Tarusawa et al. ............. 248/429 |
| 2011/0233370 A1 * | 9/2011 | Wakayama et al. ........... 248/429 |
| 2011/0315847 A1 * | 12/2011 | Simms et al. ................. 248/429 |
| 2012/0074287 A1 * | 3/2012 | Wojatzki et al. ............. 248/429 |

\* cited by examiner

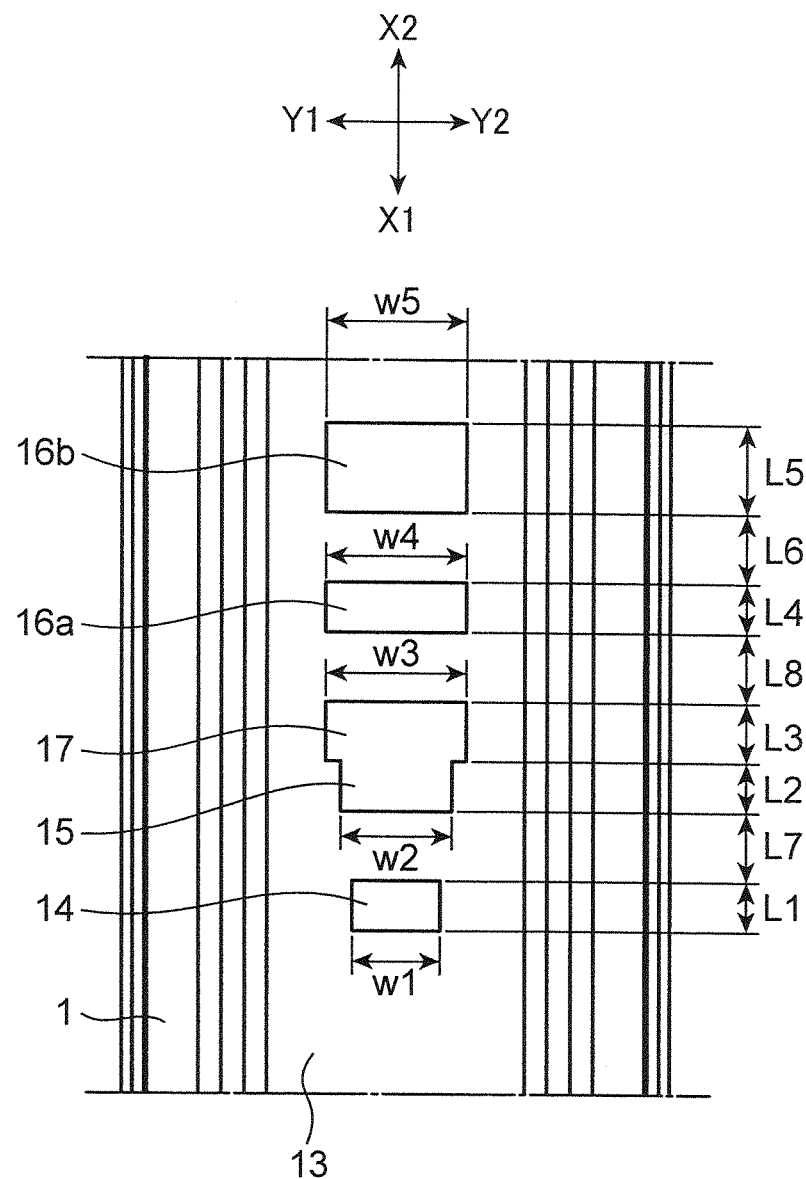

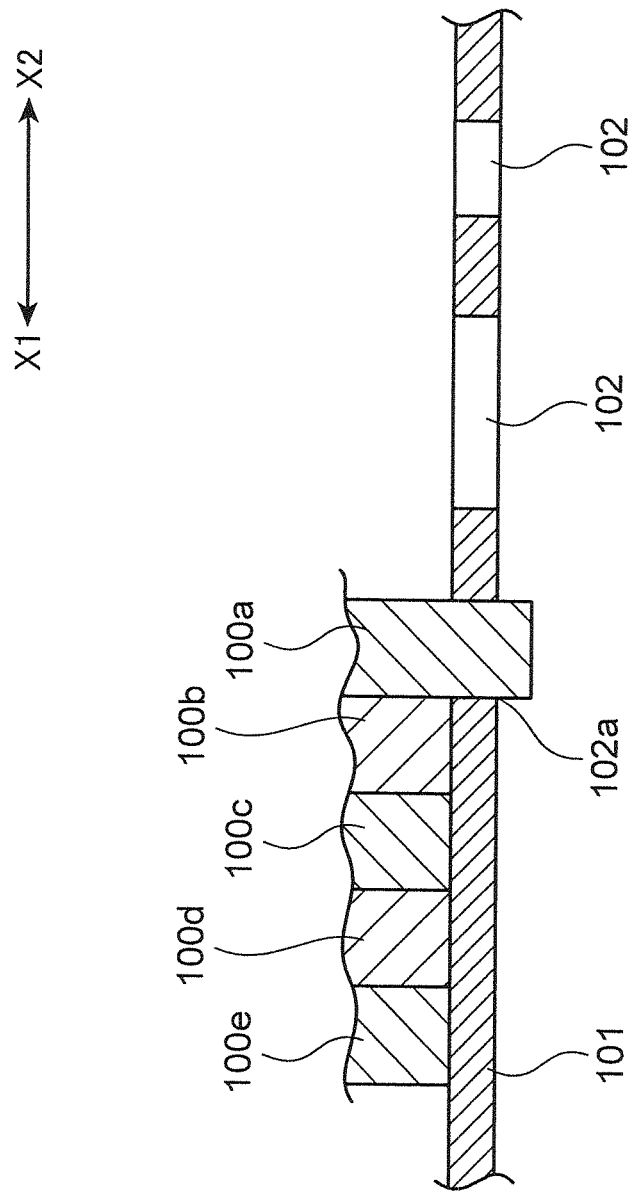

SEAT SLIDE LOCKING APPARATUS

TECHNICAL FIELD

The present invention relates to a slide locking apparatus for a seat of an automobile, or the like.

BACKGROUND ART

Conventionally, a seat slide locking apparatus is known, such as the apparatus disclosed in Japanese Examined Utility Model Application Publication No. S47-39764. The apparatus disclosed in Japanese Examined Utility Model Application Publication No. S47-39764 comprises a plurality of locking piece accommodating sections (recesses) which are provided in a lower rail that is fixed to a floor and which are arranged in a front/rear direction following a lengthwise direction of the lower rail, and one locking piece which is provided in an upper rail installed in a fixed fashion to a seat and which has a locking hook that interlocks with and is received in the locking piece accommodating sections. The locking piece is locked by being inserted into a suitable one of the locking piece accommodating sections, in such a manner that the seat can be fixed in the front/rear position.

SUMMARY OF THE INVENTION

Problem to be Solved by the Invention

However, as in the seat slide locking apparatus disclosed in Japanese Examined Utility Model Application Publication No. S47-39764, if a large force is applied to the seat when one locking piece has been fitted into and locked with one locking piece accommodating section, then that force is applied at one point, which is the abutting portion between the locking piece and the inner wall of the locking piece accommodating section, and there is a risk of bending of the locking piece or breakage of the locking piece accommodating section.

Therefore, as a method for resolving problems of this kind, for example, a plurality of locking pieces are arranged in the front/rear direction on the seat, in such a manner that a plurality of locking pieces enter simultaneously into a plurality of locking piece accommodating sections.

However, if a walk-in mechanism is provided, for example, then as shown in FIG. 14, when the seat is moved forwards (the X1 direction in FIG. 14) and the rearmost locking piece 100a on the rearmost side of the locking pieces 100a to 100e enters the frontmost locking piece accommodating section 102a of the locking pieces accommodating sections 102 provided in the lower rail 101, then the rearmost locking piece 100a alone enters the frontmost locking piece accommodating section 102a only. In a case of this kind, force from the seat is applied to one point, which is the abutting portion between the locking piece 100a and the inner wall of the locking piece accommodating section 102a. Consequently, similarly to when one locking piece is provided as described above, there is a risk of bending of the locking piece or breakage of the locking piece accommodating section.

It is an object of the present invention to provide a seat slide locking apparatus in which a plurality of locking pieces enter simultaneously into a plurality of locking piece accommodating sections, at all times, when a seat is moved forwards (or rearwards), and hence there is little risk of breakage of the locking pieces or locking piece accommodating sections.

Means for Solving the Problem

In order to resolve the problem described above, the present invention is a seat slide locking apparatus comprising the following constituent elements. More specifically, the seat slide locking apparatus of the present invention has:

a lower rail (1);

an upper rail (2) which is movable along a lengthwise direction of the lower rail (1);

a plurality of locking pieces which are provided on one of the lower rail and the upper rail, and which have locking hook sections arranged in one row, with thickness directions thereof aligned in the lengthwise direction of the one of the lower rail and the upper rail; and a plurality of locking piece accommodating sections which are provided in the other one of the lower rail and the upper rail and which accommodate the locking hook sections of the locking pieces, wherein the plurality of locking pieces are constituted by pieces of a plurality of types having the locking hook sections of different widths; and the plurality of locking piece accommodating sections are constituted by accommodating sections of a plurality of types having different widths which are formed so as to correspond to the widths of the respective locking hook sections.

By adopting the composition described above, when the seat moves forwards (or rearwards), a plurality of locking pieces enter simultaneously into the plurality of locking piece accommodating sections, at all times, and hence there is little risk of breakage of the locking pieces or the locking piece accommodating sections.

These and other objects, features and advantages of the present invention will become apparent upon reading of the following detailed description along with the accompanied drawings.

BRIEF DESCRIPTION OF DRAWINGS

FIG. 5 is an enlarged bottom surface diagram of the principal part of a lower rail;

FIG. 14 is an illustrative cross-sectional diagram of a prior art example.

DETAILED DESCRIPTION OF INVENTION

Figure 1:
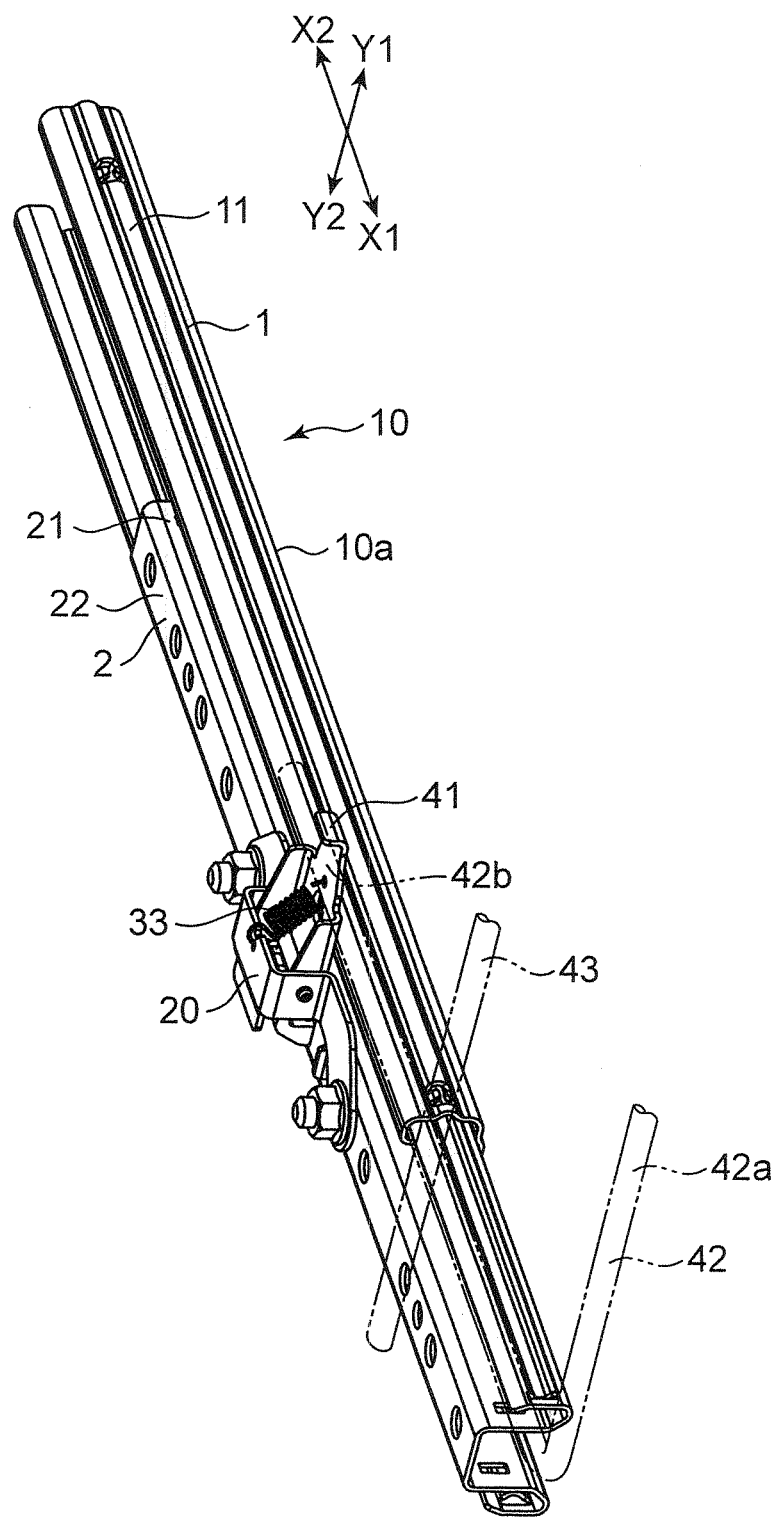
FIG. 1 is a perspective diagram of a right-hand portion of a seat slide locking apparatus for an automobile according to one embodiment of the present invention.
Figure 2:
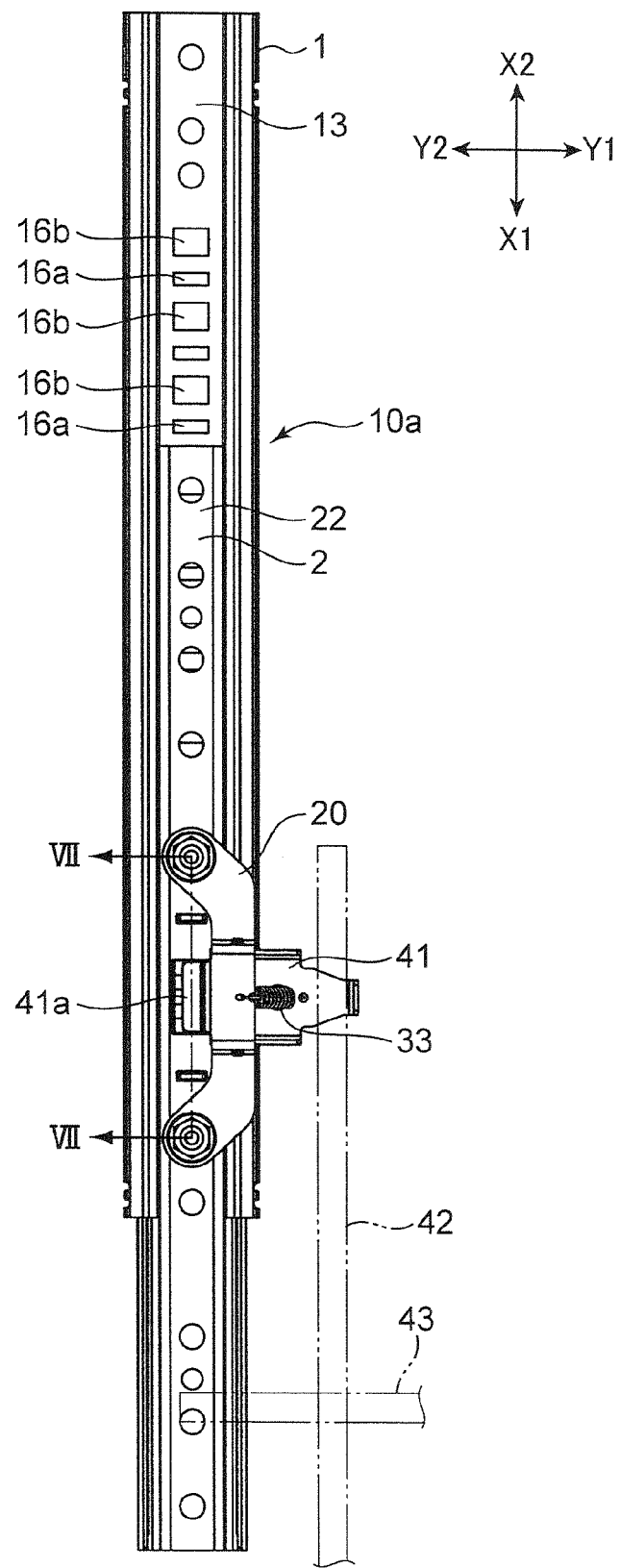
FIG. 2 is a plan view diagram of the seat slide locking apparatus for an automobile in FIG. 1.
Figure 3:
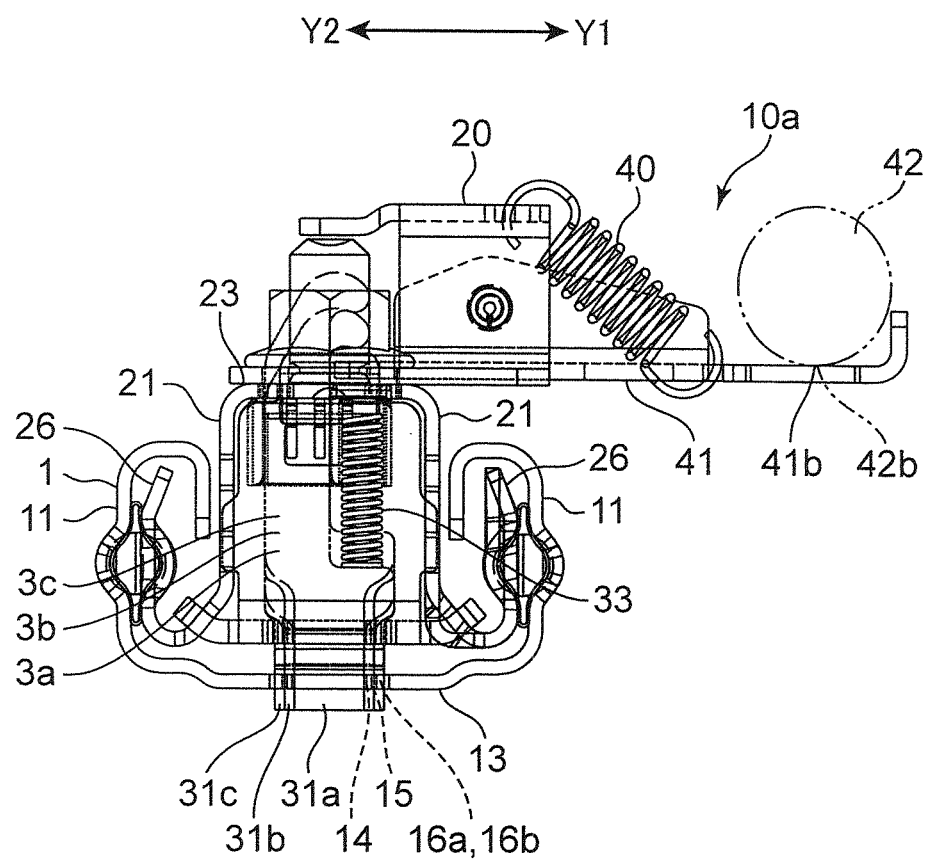
FIG. 3 is a front view diagram of the seat slide locking apparatus for an automobile in FIG. 1.
Figure 4:
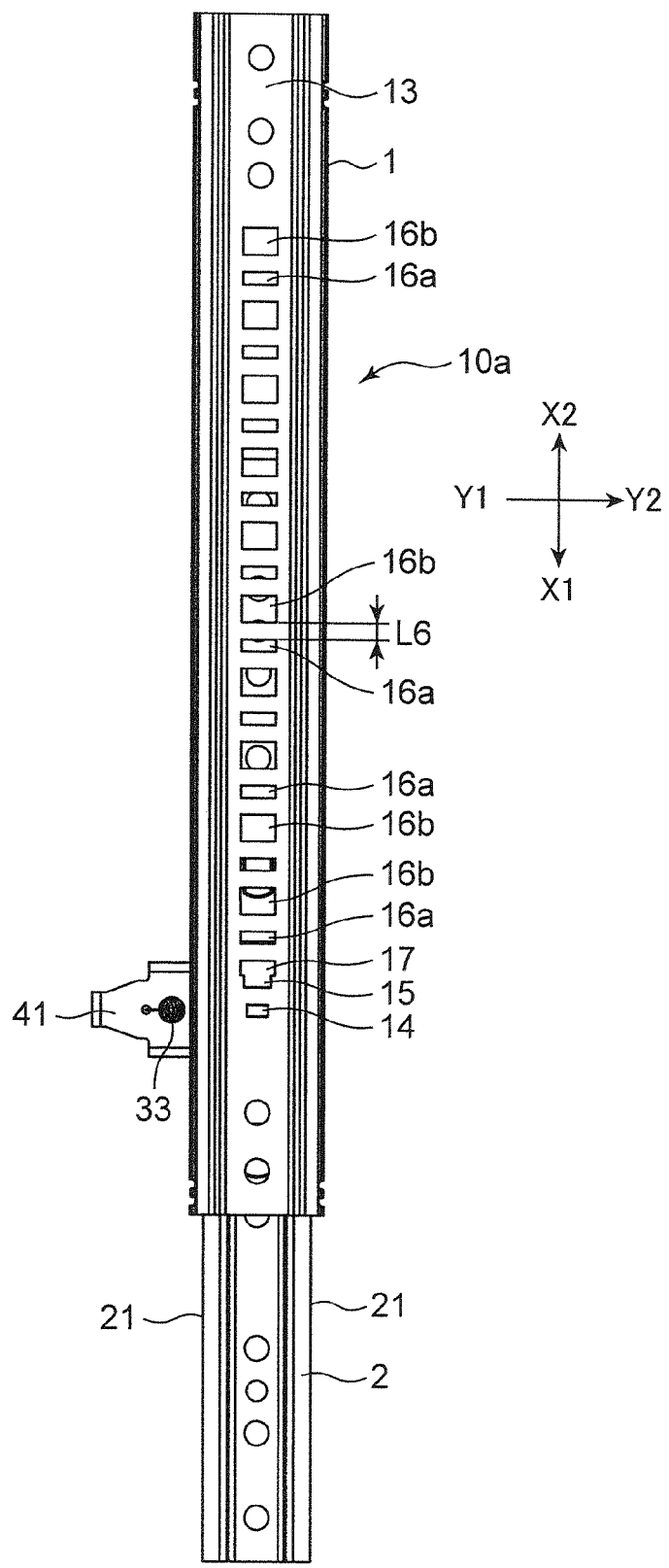
FIG. 4 is a bottom surface diagram of the seat slide locking apparatus for an automobile in FIG. 1.

Below, a preferred embodiment of the present invention is described in detail with reference to the drawings. FIG. 1 is a perspective diagram of a right side portion of a seat slide locking apparatus for an automobile according to one embodiment of the present invention, FIG. 2 is a plan diagram of the seat slide locking apparatus for an automobile in FIG. 1, FIG. 3 is a front view diagram of the seat slide locking apparatus for an automobile in FIG. 1 and FIG. 4 is a bottom surface diagram of the seat slide locking apparatus for an automobile in FIG. 1. The X1 direction in the drawings indicates a front side and the X2 direction indicates a rear side. Furthermore, the Y1 direction in the drawings indicates a left side and the Y2 direction indicates a right side.

The seat slide locking apparatus 10 according to the present invention suitably locks and unlocks sliding of an upper rail 2 with respect to a lower rail 1. In this embodiment, a slide locking apparatus for an automobile is described.

As shown in FIG. 1 to FIG. 4, the seat slide locking apparatus 10 for an automobile according to this embodiment includes a right-hand sliding section 10a which is disposed on the lower right-hand side of a seat, for example, a driver's seat, a left-hand sliding section (not illustrated) which is disposed on the lower left-hand side of the driver's seat, a plurality of locking pieces 3a to 3c (see FIG. 7) and locking release operating members 40 to 42.

The left-hand sliding section 10a and the right-hand sliding section are disposed in left/right symmetry. Below, the right-hand sliding section 10a is described and the description of the left-hand sliding section is omitted.

As shown in FIG. 1 to FIG. 7, the right-hand sliding section 10a includes a lower rail 1 and an upper rail 2.

The lower rail 1 is constituted by a long member, which is fixed to the floor of an automobile with the lengthwise direction aligned to the front/rear direction of the automobile. As shown in FIG. 3, the lower rail 1 includes a pair of left and right-hand side walls 1 arranged in opposing fashion at a distance apart in the left/right direction, and a bottom wall 13 which connects together the lower ends (base ends) of the side walls.

Furthermore, as shown in FIG. 4 and FIG. 5, locking piece accommodating holes 14 to 16b are provided in the bottom wall 13 and act as a plurality of locking piece accommodating sections into which the locking pieces 3a to 3c are inserted. Furthermore, the locking piece accommodating holes of this embodiment are made up of three types having different widths in the left/right direction (lengths in a direction perpendicular to the lengthwise direction), namely, one first locking piece accommodating hole 14, one second locking piece accommodating hole 15 and a plurality of third locking piece accommodating holes 16a, 16b.

In this embodiment, the first locking piece accommodating hole 14 to the third locking piece accommodating holes 16a, 16b are constituted by holes which pass from the upper surface to the lower surface of the bottom wall 13.

The third locking piece accommodating holes are constituted by third short locking piece accommodating holes 16a and third long locking piece accommodating holes 16b.

As shown in FIG. 5, the third short locking piece accommodating holes 16a are set to have a front/rear length L4 which is the same as the length L1 of the first locking piece accommodating hole 14 described above, and a width W4 which is greater than the width W1 of the first locking piece accommodating hole 14.

The third long locking piece accommodating holes 16b are set to have a front/rear length L5 which is two times the length L4 of the third short locking piece accommodating holes 16a described above, and a width W5 (length in a direction perpendicular to the lengthwise direction) which is the same as the width W4 of the third short locking piece accommodating holes 16a.

As shown in FIG. 4, the third short locking piece accommodating holes 16a and the third long locking piece accommodating holes 16b are arranged alternately along the lengthwise direction of the lower rail 1 from the rear end side (other end side) towards the front side.

Furthermore, the distance L6 in the lengthwise direction between the third short locking piece accommodating holes 16a and the third long locking piece accommodating holes 16b is set to be the same as the length L4 of the third short locking piece accommodating holes 16a.

The first locking piece accommodating hole 14 forms a narrowest locking piece accommodating hole which has a narrowest width, of all of the locking piece accommodating holes 14 to 16b, and in the present embodiment, the locking piece accommodating hole 14 is disposed on the front end side (one end side) of the lower rail 1 so as to be positioned to the front side of the second locking piece accommodating hole 15 and the third locking piece accommodating holes 16a, 16b. Hence, the first locking piece accommodating hole 14 is arranged furthest towards the front side, of all of the locking piece accommodating holes 14 to 16b.

The second locking piece accommodating hole 15 is set to have a width W2 which is greater than the width W1 of the first locking piece accommodating hole 14 and smaller than the width W4 of the third short locking piece accommodating hole 16a.

Furthermore, in this embodiment, a connecting hole 17 formed so as to communicate with the second locking piece accommodating hole 15 is provided to the rear side of the second locking piece accommodating hole 15. This connecting hole 17 is set so as to have a front/rear length L3 and a width W3 which are respectively the same as the length L4 and the width W4 of the third short locking piece accommodating holes 16a described above. Consequently, the overall front/rear length of the connecting hole 17 and the second locking piece accommodating hole 15 is the same as the length L5 of the third long locking piece accommodating hole 16b.

The connecting hole 17 and the second locking piece accommodating hole 15 are disposed between the first locking piece accommodating hole 14 and the third short locking piece accommodating hole 16a in such a manner that the distance L7 between the second locking piece accommodating hole 15 and the first locking piece accommodating hole 14, and the distance L8 between the connecting hole 17 and the third short locking piece accommodating hole 16a, are the same as the distance L6 described above.

As shown in FIG. 1 to FIG. 4, the upper rail 2 is constituted by a long member which is of substantially the same length as the lower rail 1, is installed in fixed fashion to an automobile seat (not illustrated) and is arranged slidably along the lengthwise direction of the lower rail 1. Due to the upper rail 2 sliding along the lower rail 1, the automobile seat is able to move in the front/rear direction.

As shown in FIG. 3, the upper rail 2 includes left and right-hand side walls 21 arranged in opposing fashion at a distance apart in the left/right direction and a top wall 23 which connects together the upper ends (base ends) of the side walls 21.

Furthermore, in this embodiment, the left and right side walls 21 are formed by bending respectively downwards from the left and right-hand ends of the top wall 23, in addition to which fold back pieces 26 which are bent upwards to the outer side from the lower front end of each side wall are also provided.

Figure 7:
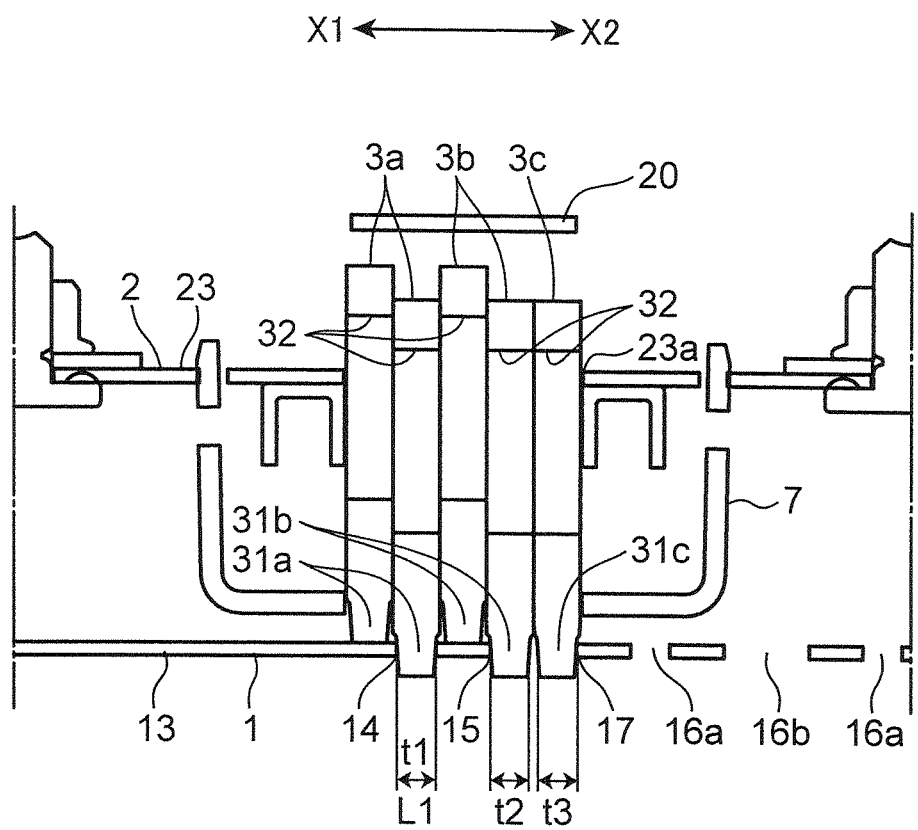
FIG. 7 is an enlarged cross-sectional diagram along VII-VII in FIG. 2.

Moreover, as shown in FIG. 7, a locking piece insertion hole 23a through which the locking pieces 3a to 3c can be inserted movably in the vertical direction is provided in the top wall 23.

Next, the locking pieces 3a to 3c will be described. In this embodiment, the locking pieces are constituted by a total of five locking pieces, namely, two first locking pieces 3a which have the same composition, two second locking pieces 3b which have the same composition, and one third locking piece 3c.

Figure 6A:
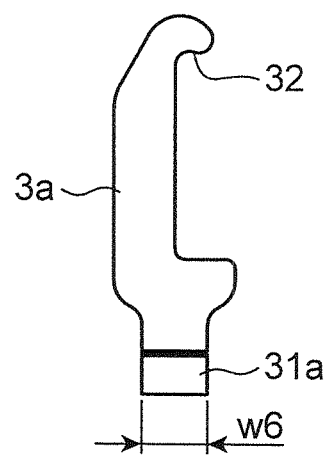
FIG. 6A is a front view diagram of a first locking piece.

As shown in FIG. 6A, the first locking pieces 3a respectively comprise a narrow width locking hook section 31a which can enter into and exit from the locking piece accommodating holes 14 to 16b of the lower rail 1, provided in a lower portion thereof, and an operating section 32 which is pulled up and operated by a locking piece operating member 41 of a locking release operating member described below, provided in an upper portion thereof.

The narrow width locking hook section 31a is formed so as to correspond to the width of the first locking piece accommodating hole 14; the width W6 thereof is substantially the same as the width W1 of the first locking piece accommodating hole 14, and the thickness t1 thereof is substantially the same as the front/rear length L1 of the first locking piece accommodating hole 14 as shown in FIG. 7.

Accordingly, the narrow width locking hook section 31a can enter the first locking piece accommodating hole 14, as well as being able to enter the second locking piece accommodating hole 15, the connecting hole 17, and both the third short locking piece accommodating holes 16a and the third long locking piece accommodating holes 16b of the third locking piece accommodating holes.

Figure 6B:
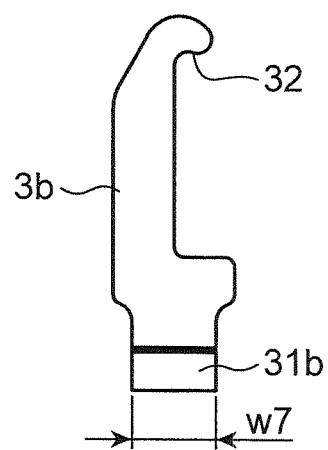
FIG. 6B is a front view diagram of a second locking piece.

As shown in FIG. 6B, the second locking pieces 3b each comprise, in a lower portion thereof, an intermediate width locking hook section 31b which enters into and exits from the locking piece accommodating holes 15 to 16b of the lower rail 1.

This intermediate width locking hook section 31b is formed so as to correspond to the width of the second locking piece accommodating hole 15, and the width W7 thereof is substantially the same as the width W2 of the second locking piece accommodating hole 15.

Consequently, the intermediate width locking hook section 31b can enter any of the second locking piece accommodating hole 15, the connecting hole 17, and both the third short locking piece accommodating holes 16a and the third long locking piece accommodating holes 16b of the third locking piece accommodating holes. Apart from this, the second locking pieces 3b have the same composition as the first locking pieces 3a.

Figure 6C:
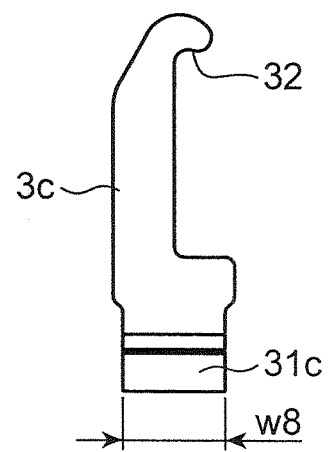
FIG. 6C is a front view diagram of a third locking piece.

As shown in FIG. 6C, the third locking pieces 3c each comprise, in a lower portion thereof, a broad width locking hook section 31c which enters into and exits from the third short locking piece accommodating holes 16a and the third long locking piece accommodating holes 16b of the locking piece accommodating holes in the lower rail 1.

This broad width locking hook section 31c is formed so as to correspond to the width of the third locking piece accommodating holes 16a, 16b, and the width W8 thereof is the same as the widths W4, W5 of the third locking piece accommodating holes 16a, 16b.

Consequently, the broad width locking hook section 31c can enter any of the third short locking piece accommodating holes 16a and the third long locking piece accommodating holes 16b of the third locking piece accommodating holes. Apart from this, the broad width locking hook section 31c has the same composition as the first locking piece 3a.

As shown in FIG. 7, the locking pieces 3a to 3c which have been composed in this way are arranged with their thickness direction aligned in the lengthwise direction of the upper rail 2, successively towards the rear side in order of increasing width of the locking hook sections 31a, 31b, 31c, starting from the first locking piece 3a having the narrowest width, and are held on the upper rail 2 movably in the vertical direction by means of a holding member 7.

More specifically, the first locking piece 3a to the third locking piece 3c are held movably in the vertical direction by the holding member 7, so as to be aligned in one row in the front/rear direction with virtually no gaps therebetween. Furthermore, the first locking piece 3a to the third locking piece 3c which are held by the holding member 7 are each respectively impelled downwards with respect to the holding member 7 by coil springs 33 which form locking piece impelling members, as shown in FIG. 3 and FIG. 9.

In this way, the holding member 7 which holds the first locking pieces 3a to the third locking piece 3c is installed in a fixed fashion on the upper rail 2. Furthermore, in this state, the first locking pieces 3a to the third locking piece 3c each pass through the locking piece insertion hole 23a in the upper rail 2 and the operating sections 32 thereof project to the upper side of the top wall 23 of the upper rail 2, in addition to which the locking hook sections 31a to 31c can enter into and exit from the locking piece accommodating holes 14 to 15b of the lower rail 1.

Next, the locking release operating members 40, 41, 42 will be described. The locking release operating members 40, 41, 42 are members used in order to perform an unlocking operation of the locking pieces 3a to 3c, and as shown in FIG. 1 to FIG. 5, include a locking piece operating member 41 which pushes the locking pieces 3a to 3c up against the impelling force of the coil spring 33 described above, an operating member impelling spring 40 which impels the locking piece operating member 41, and an operating body 42 for moving and operating the locking piece operating member 41.

Figure 9:
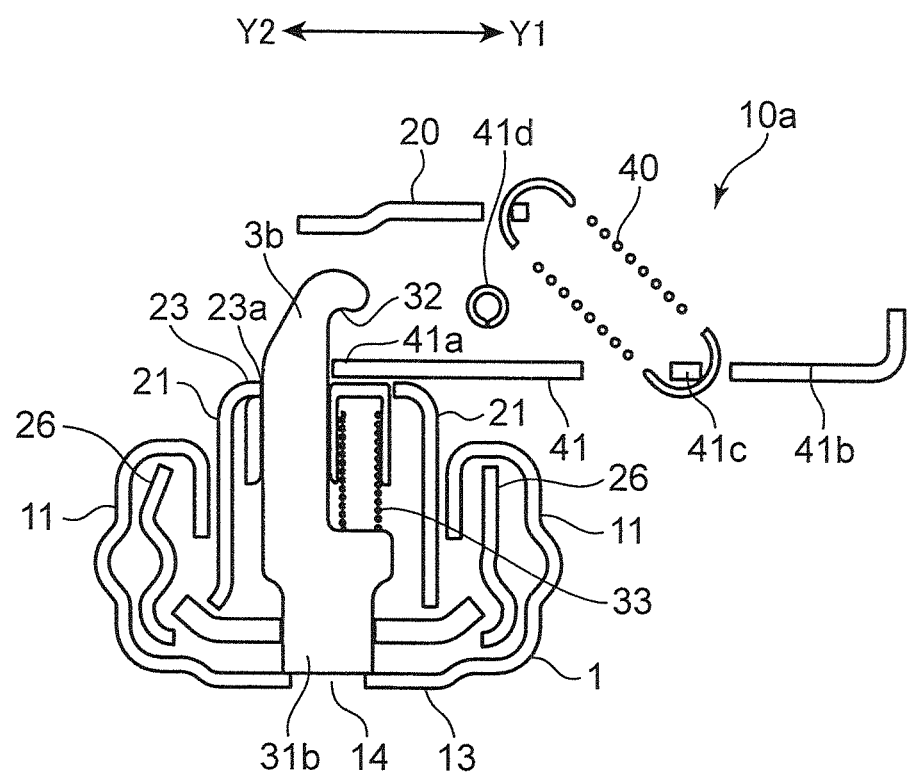
FIG. 9 is a cross-sectional diagram along IX-IX in FIG. 8.

As shown in FIG. 9, the locking piece operating member 41 includes a locking piece pressing section 41a for pressing and operating the operating sections 32 of the locking pieces 3a to 3c, on the right-hand end thereof (on one end: the left-hand end in FIG. 9).

As shown in FIG. 2, the locking piece pressing section 41a is set to have a length in the front/rear direction which is slightly longer than the total front/rear length of the five locking pieces 3a to 3c, so as to be able to press the operating sections 32 of the five locking pieces 3a to 3c simultaneously.

Furthermore, the locking piece operating member 41 comprises, on the left end side thereof (the right end side in the drawing), a pressed operating section 41b which is pressed and operated by the operating body 42. This locking piece operating member 41 is installed rotatably on the top wall 23 of the upper rail 2 via an operating member supporting member 20.

More specifically, the operating member supporting member 20, which is arranged so as to cover the locking pieces 3a to 3c from above, is provided in a fixed fashion on the upper wall 23 of the upper rail 2. As shown in FIG. 9, the locking piece operating member 41 is installed rotatably on the top wall 23 of the upper rail 2 in such a manner that an axle support section 41d, which consists of a hole provided between the locking piece pressing section 41a and the pressed operating section 41b and an engaging piece 41c, is axially supported on the operating member supporting member 20, whereby the locking piece pressing section 41a and the pressed operating section 41b can be rotated respectively in the vertical direction.

When the pressed operating section 41b is pressed downwards, the locking piece pressing section 41a rotates upwards. Furthermore, with this upward rotation, the locking piece pressing section 41a presses each of the locking pieces 3a to 3c upwards by pressing the operating sections 32 of the respective locking pieces 3a to 3c.

One end of the operating member impelling spring 40 engages with the operating member supporting member 20, and the other end thereof is installed on a portion of the locking piece pressing section 41 toward the side of the pressed operating section 41b from the axle support section 41d.

By this means, the locking piece operating member 41 is impelled in a counter-clockwise direction in FIG. 9, due to the impelling force of the operating member impelling spring 40, and the pressed operating section 41b is always impelled upwards, while the locking piece pressing section 41a is always impelled downwards.

In this embodiment, as shown in FIG. 1 and FIG. 2, the operating body 42 is constituted by a round bar which is bent in an approximate U shape (in FIG. 1 and FIG. 2, the left-hand half only is depicted, in the form of an L shape).

The operating body 42 includes an operation gripping section 42a which is positioned on the front end thereof, and pressing sections 42b positioned respectively on the left and right-hand rear ends of the operating body 42, which press against the pressed operating sections 41b of the locking piece operating members 41 of the right-hand sliding section 10a and the left-hand sliding section.

The operation gripping section 42a is disposed to the lower side of the front end side of the seat, which is not illustrated, and an occupant sitting on the seat is able to grip and operate the operation gripping section 42a while seated. Furthermore, as shown in FIG. 1 and FIG. 9, the pressing sections 42b are arranged in a substantially abutted state on the upper side of the pressed operating sections 41b.

In this embodiment, the operating body 42 is arranged rotatably via axles 43. More specifically, axles 43 are fixed to the seat. The intermediate portions of the operating body 42 between the operation gripping section 42a and the pressing sections 42b are able to rotate about these axles 43.

By this means, when the operation gripping section 42a is pushed up by the occupant of the seat, the pressing sections 42b are moved downwards and the pressed operating sections 41b are pressed downwards.

The operation gripping section 42a of the operating body 42 according to this embodiment is impelled downwards by an operating body impelling spring, which is not shown, and when a person has pulled the operation gripping section 42a up manually and then releases his or her hand, the operation gripping section 42a returns to the original state shown in FIG. 9, due to the impelling force of the operating body impelling spring.

Next, the operation of the slide locking apparatus for an automobile seat according to the present embodiment will be described. For the sake of the description, the following explanation starts from the locked state shown in FIG. 7, in which a first locking piece 3a is inserted into the first locking piece accommodating hole 14, a second locking piece 3b is inserted into the second locking piece accommodating hole 15, and a third locking piece 3c is inserted into the connecting hole 17.

When the operation gripping section 42a of the operating body 42 is pulled up by the occupant of the seat, each pressed operating section 41b is pressed downwards by the pressing section 42b, as shown in FIG. 3.

Figure 8:
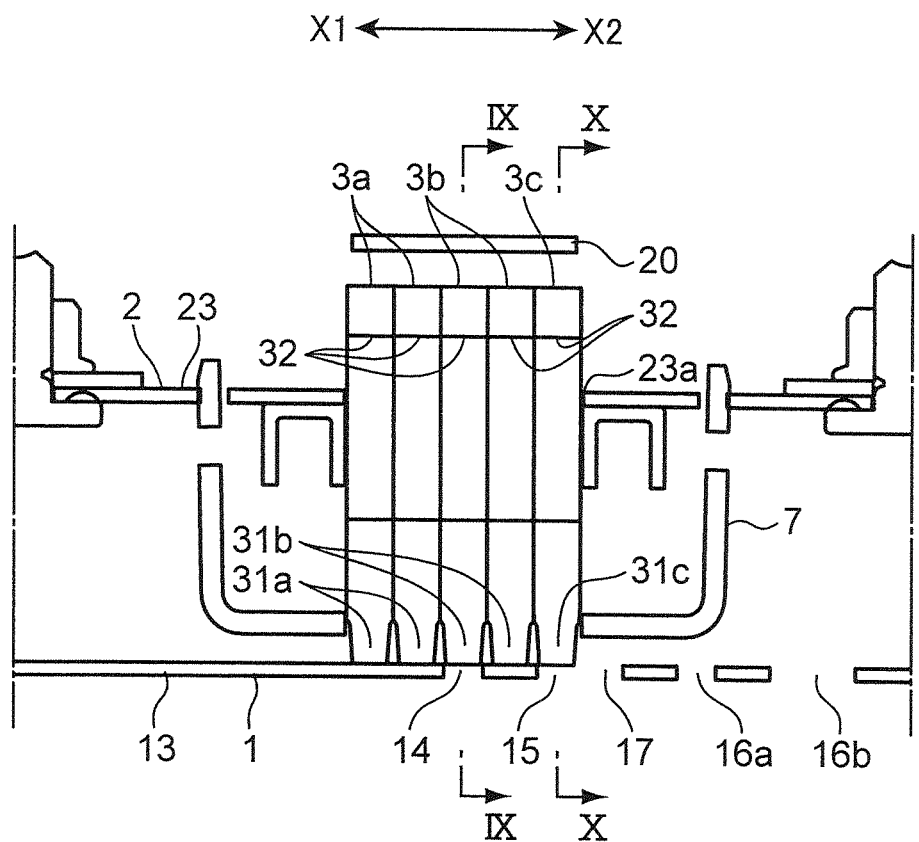
FIG. 8 is a cross-sectional diagram showing locking pieces and locking piece accommodating holes when rearwardly moving a seat which has been moved to a frontmost side.

Consequently, the locking piece pressing section 41a abuts against the operated sections 32 of all of the locking pieces 3a to 3c, and the locking piece pressing section 41a pushes all of the locking pieces 3a to 3c up against the impelling force of the coil springs 33. In this state, as shown in FIG. 8, for example, the locking hook sections 31a to 31c of all of the locking pieces 3a to 3c exit from the locking piece accommodating holes 14 to 16b, the lower ends of the locking pieces 3a to 3c are raised up from the bottom wall 13 of the lower rail 1, and the locking pieces assume an unlocked state.

Furthermore, in this state, the upper rail 2 becomes slidable with respect to the lower rail 1; for example, if the seat is pushed forwards by the occupant of the seat, the upper rail 2 slides forwards with respect to the lower rails 1 and the seat moves forwards.

Although not shown in the drawings, when the seat is moved forwards until the third locking piece 3c arrives at a position to the front side of the first locking piece accommodating hole 14, then since no locking piece accommodating hole for inserting the locking pieces 3a to 3c is provided at this position, the unlocked state is maintained.

On the other hand, when the seat is returned toward the rear side from this state, then the seat is pushed rearwards. By this means, the seat can be moved towards the rear side. Even if the third locking piece 3c reaches a position over the first locking piece accommodating hole 14, since the width W8 of the locking hook section 31c of the third locking piece 3c is greater than the width W1 of the first locking piece accommodating hole 14, then the third locking piece 3c passes over the first locking piece accommodating hole 14 without entering therein.

Figure 10:
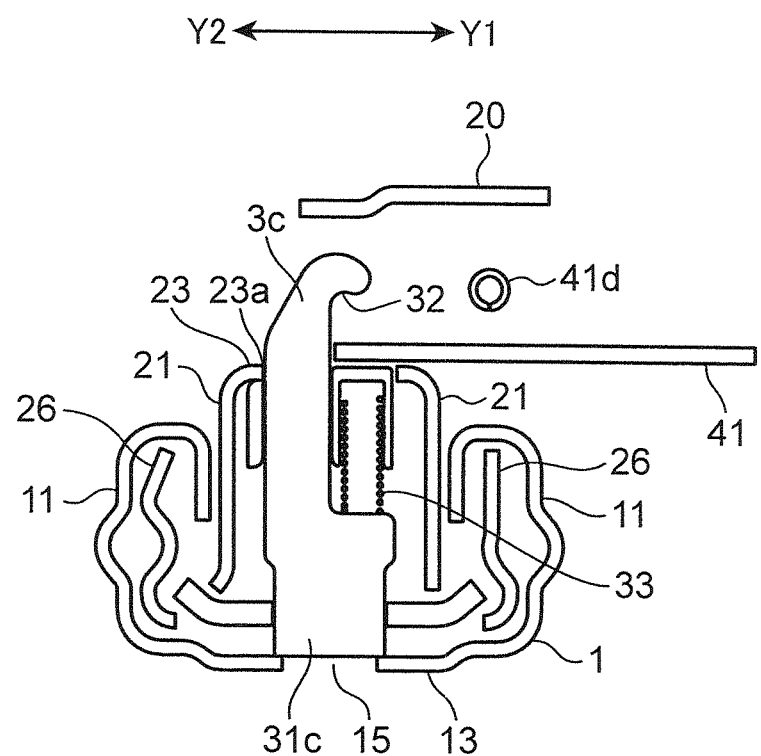
FIG. 10 is a cross-sectional diagram along X-X in FIG. 9.

Moreover, if the seat is moved rearwards and the third locking piece 3c arrives at a position over the second locking piece accommodating hole 15, in addition to which a second locking piece 3b arrives at a position over the first locking piece accommodating hole 14, then in this case also, since the width W8 of the locking hook section 31c of the third locking piece 3c is greater than the width W2 of the second locking piece accommodating hole 15, as shown in FIG. 10, and since the width W7 of the locking hook section 31b of the second locking piece 3b is greater than the width W1 of the first locking piece accommodating hole 14 as shown in FIG. 9, then the third locking piece 3c and the second locking piece 3b respectively pass over the aforementioned holes without entering therein.

If the seat is moved further rearwards and, as shown in FIG. 7, the third locking piece 3c is aligned with the connecting hole 17, then the third locking piece 3c enters the connecting hole 17. Furthermore, simultaneously with this, a second locking piece 3b becomes aligned with the second locking piece accommodating hole 15 and enters the second locking piece accommodating hole 15, and a first locking piece 3a becomes aligned with the first locking piece accommodating hole 14 and enters the first locking piece accommodating hole 14, thereby assuming a locked state.

Consequently, when the third locking piece 3c is moved towards the rear side of the seat from a state to the front side of the first locking piece accommodating hole 14, a locked state can be achieved in which three locking pieces 3a to 3c each enter one of the locking piece accommodating holes 14 to 16b at all times, and it is therefore possible to prevent a situation where a locked state is assumed in which only one locking piece enters a locking piece accommodating hole.

Therefore, it is possible reliably to prevent bending of the locking pieces or breakage of the locking piece accommodating holes, which may occur in cases where a locked state is based on only one locking piece entering a locking piece accommodating hole.

In the embodiment described above, a connecting hole 17 is provided in the second locking piece accommodating hole 15, but the invention is not limited to this mode and can be varied suitably, and the second locking piece accommodating hole 15 does not have to be provided with a connecting hole 17.

Figure 11:
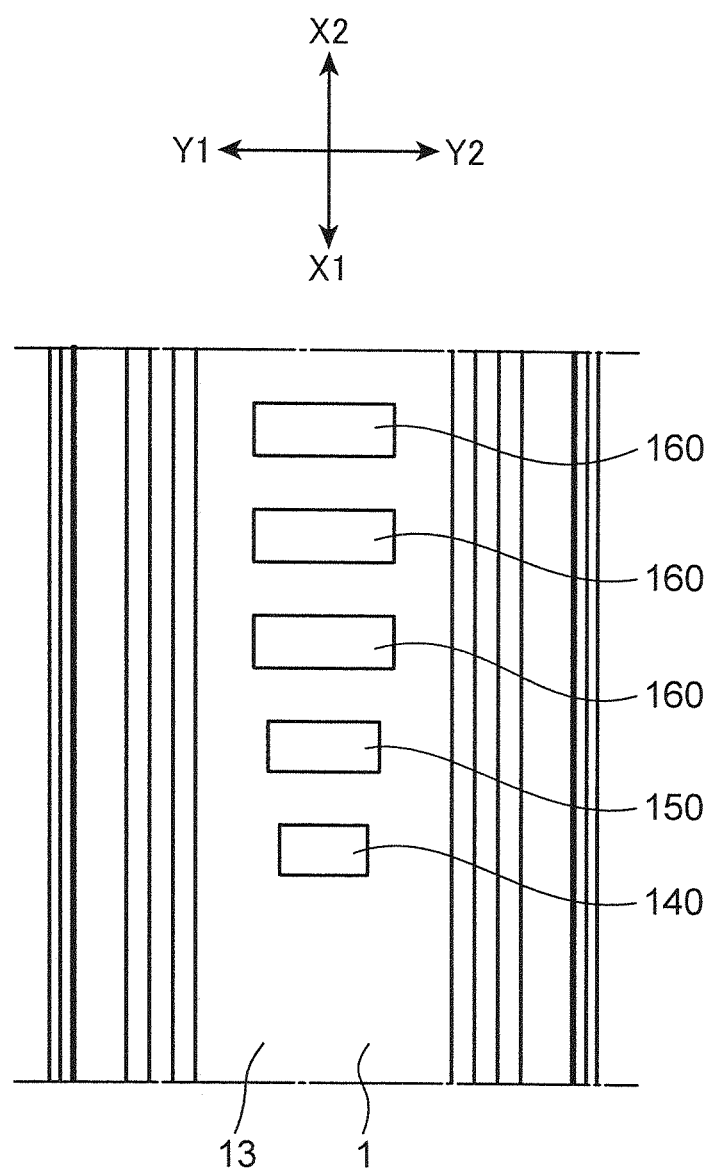
FIG. 11 is an illustrative diagram of a further embodiment of locking piece accommodating holes.

For example, as shown in FIG. 11, the second locking piece accommodating hole 150 is formed to a greater width than the first locking piece accommodating hole 140 and to a narrower width than the third locking piece accommodating holes 160, and furthermore dimensions of the third locking piece accommodating holes 160 along a X1-X2 direction are all designed to the same as those of the first locking piece accommodating hole 140 along a X1-X2 direction.

Furthermore, in the embodiment described above, the locking pieces are constituted by five locking pieces of three types having different widths, but the invention is not limited to this and can be varied appropriately, and the locking pieces can be constituted by four or more locking pieces comprising two types having different widths.

Figure 12:
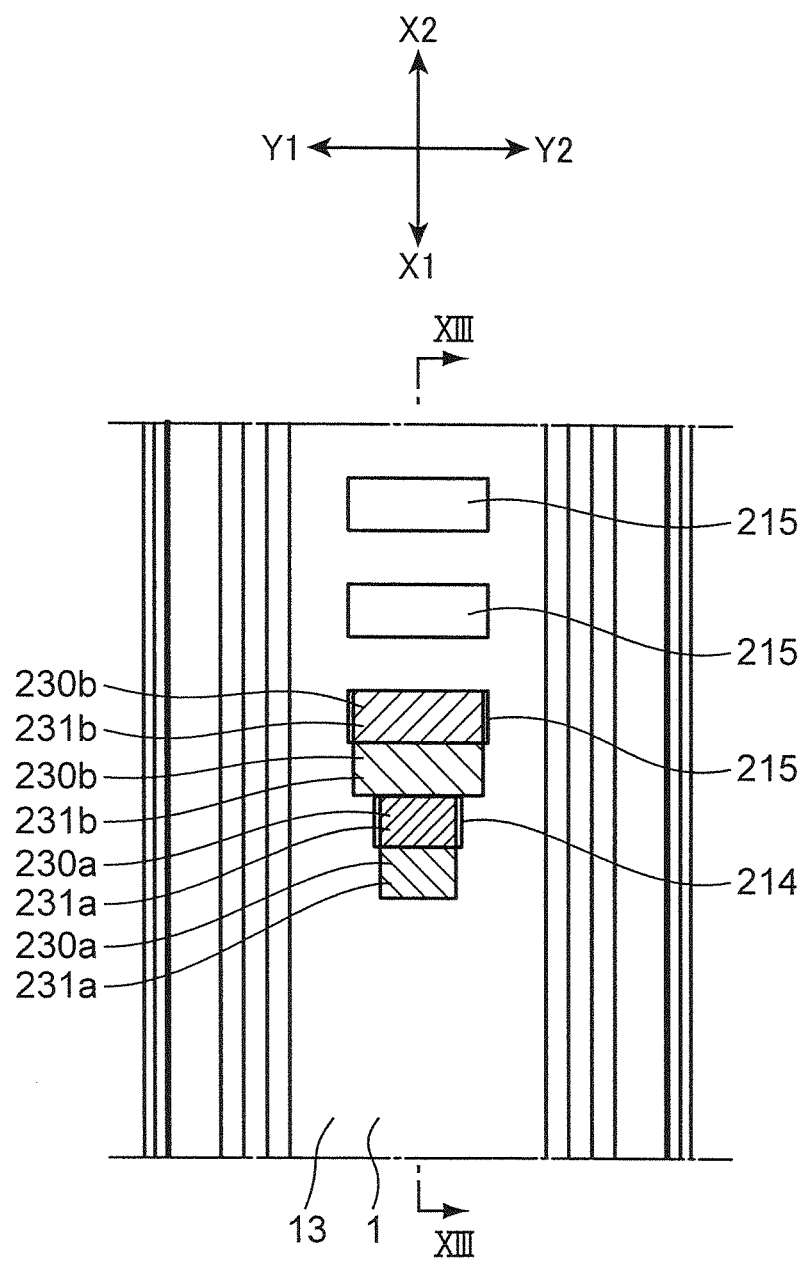
FIG. 12 is an illustrative diagram of a further embodiment of locking piece accommodating holes.
Figure 13:
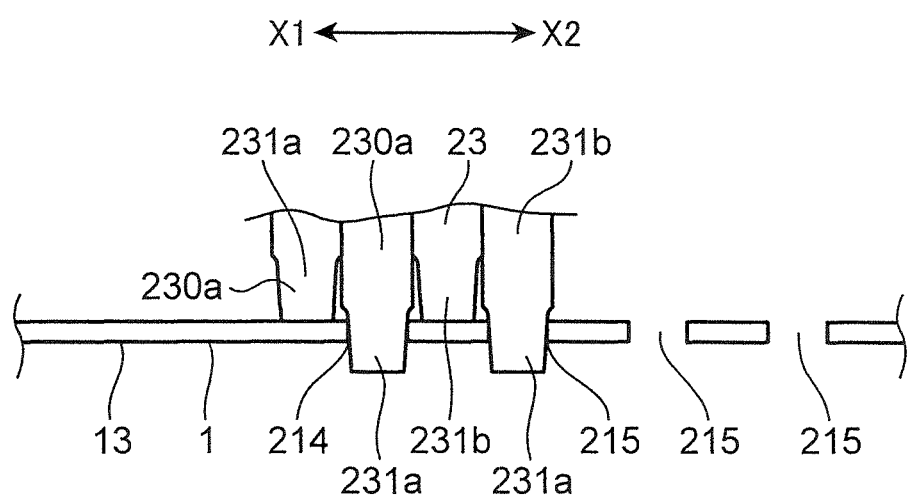
FIG. 13 is a cross-sectional diagram along line XIII-XIII in FIG. 12.

For example, as shown in FIG. 12 and FIG. 13, the locking pieces are constituted by two first locking pieces 230a having the same composition and two second locking pieces 230b having the same composition, and furthermore, the locking piece accommodating holes are constituted by one first locking piece accommodating hole 214 and a plurality of second locking piece accommodating holes 215 which are of greater width than the first locking piece accommodating hole 214.

The intermediate width locking hook sections 231b of each of the second locking pieces 230b are set to have a greater width than the width of the narrow width locking hook sections 231a of the first locking pieces 230a.

The first locking piece accommodating hole 214 is set to have a width which is greater than the width of the narrow width locking hook section 231a and which is narrower than the width of the intermediate width locking hook section 231b, so as to be able to accommodate a narrow width locking hook section 231a of the first locking piece 230a, and so as to be unable to accommodate an intermediate width locking hook section 231b of the second locking piece 230b.

Even in this case, it is possible to achieve a locked state in which two or more locking pieces 230a, 230b have entered into one of the locking piece accommodating holes 214, 215 at all times.

Furthermore, in the embodiment described above, a first locking piece is provided on the front end side of the upper rail, a second locking piece is provided to the rear side of the first locking piece, and a third locking piece is provided to the rear side of the second locking piece, and in accordance with the alignment of these locking pieces, a first locking piece accommodating hole is provided on a front end side of the lower rail, a second locking piece accommodating hole is provided to the rear side of the first locking piece accommodating hole, and a third locking piece accommodating hole is provided to the rear side of the second locking piece accommodating hole. However, the present invention is not limited to this mode and can be varied appropriately.

For example, a first locking piece is provided on the rear end side of the upper rail, a second locking piece is provided to the front side of the first locking piece, and a third locking piece is provided to the front side of the second locking piece, and in accordance with the alignment of these locking pieces, a first locking piece accommodating hole is provided on a rear end side of the lower rail, a second locking piece accommodating hole is provided to the front side of the first locking piece accommodating hole, and a third locking piece accommodating hole is provided to the front side of the second locking piece accommodating hole. In other words, in terms of the state of arrangement of the plurality of accommodating holes in the lower rail 1 (the state of arrangement in the lengthwise direction of the vehicle), the X1 direction and the X2 direction in FIG. 4 and FIG. 7 are respectively changed to the rearward direction and the forward direction of the vehicle.

By adopting a composition of this kind, when the seat slides rearwards (when the upper rail 2 is moved rearwards with respect to the lower rail 1), and a first locking piece (3a) enters the first locking piece accommodating section (14), at least one of the following states arises:

(A) either the second locking piece (3b) enters the second locking piece accommodating section (15), or (B) the third locking piece enters the third locking piece accommodating section (16).

Alternatively, when the seat slides rearwards and the first locking piece (3a) enters the second locking piece accommodating section (15), at least one of the following states arises:

(A) either the second locking piece (3b) enters either one of the second locking piece accommodating section (15) and a third locking piece accommodating section (16), or (B) the third locking piece enters the third locking piece accommodating section (16).

Consequently, even if the seat slides rearwards, a plurality of locking pieces enter simultaneously into a plurality of locking piece accommodating sections, at all times, and hence there is little risk of breakage of the locking pieces or the locking piece accommodating sections.

Furthermore, in the embodiment described above, the locking piece accommodating holes are provided in the lower rail, and the locking pieces are held on the upper rail, but the invention can be varied appropriately, and it is also possible to provide the locking piece accommodating holes in the upper rail and to hold the locking pieces on the lower rail.

[Summary of the Embodiment:]

The present invention is a seat slide locking apparatus, having:

a lower rail (1);

an upper rail (2) which is movable along a lengthwise direction of the lower rail (1);

a plurality of locking pieces which are provided on one of the lower rail and the upper rail, and which have locking hook sections arranged in one row, with thickness directions thereof aligned in the lengthwise direction of the one of the lower rail and the upper rail; and a plurality of locking piece accommodating sections which are provided in the other one of the lower rail and the upper rail and which accommodate the locking hook sections of the locking pieces, wherein the plurality of locking pieces are constituted by pieces of a plurality of types having the locking hook sections of different widths; and the plurality of locking piece accommodating sections are constituted by accommodating sections of a plurality of types having different widths which are formed so as to correspond to the widths of the respective locking hook sections.

In a further mode, in the seat slide locking apparatus described above, the plurality of locking pieces are arranged successively along the lengthwise direction of the one of the lower rail and the upper rail, in order of increasing width of each of the locking hook section;

the plurality of locking piece accommodating sections are arranged in order of increasing width thereof, from one end side to the other end side, or from the other end side to the one end side, in the lengthwise direction of the other one of the lower rail and the upper rail, so as to correspond to the locking pieces which are arranged successively in order of increasing width of each of the locking hook sections, and simultaneously with a locking piece, which has a locking hook section corresponding to a locking piece accommodating section of narrowest width, entering the locking piece accommodating section of narrowest width, a locking piece having a locking hook section corresponding to a locking piece accommodating section adjacent to the locking piece accommodating section of narrowest width is able to enter the adjacent locking piece accommodating section.

According to the present invention which is composed as described above, in an unlocked state where all of the locking pieces are removed from the locking piece accommodating sections, when the seat is moved to a front side until a locking piece having a locking hook section of broadest width which is disposed on a rearmost side, for example, is situated to the front side of a narrowest width locking piece accommodating section having a narrowest width which is disposed on a frontmost side, and the seat is then moved rearwards, the locking piece of broadest width on the rearmost side passes over the narrowest width locking piece accommodating section on the frontmost side, without entering therein. Thereupon, the locking piece having a locking hook section of a width corresponding to the narrowest width locking piece accommodating section enters the narrowest width locking piece accommodating section upon becoming aligned therewith. Furthermore, in a substantially simultaneous manner with this, a locking piece having a locking hook section of a width corresponding to a locking piece accommodating section adjacent to the narrowest width locking piece accommodating section can enter this adjacent locking piece accommodating section.

Accordingly, when a locking piece enters into and locks with the narrowest width locking piece accommodating section on the frontmost side, at least the locking piece corresponding to the locking piece accommodating section adjacent to the narrowest width locking piece accommodating section on the frontmost side is able to enter into and lock with the adjacent locking piece accommodating section, and hence it is possible to avoid a situation where one of the locking pieces is locked with the frontmost locking piece accommodating section only, as in the prior art.

Therefore, it is possible to reduce the risk of breakage of the locking pieces or the locking piece accommodating sections due to the force applied to the seat when in a locked state, and a locked state provided with sufficient strength can be achieved at all times.

In a further mode, in the seat slide locking apparatus described above, the plurality of locking pieces have:

a first locking piece (3a) having a narrow width locking hook section (31a);

a third locking piece (3c) having a broad width locking hook section (31c) of broader width than the narrow width locking hook section (31a); and a second locking piece (3b) disposed between the first locking piece (3a) and the third locking piece (3c) and having an intermediate width locking hook section (31b) of broader width than the narrow width locking hook section (31a) and narrower width than the broad width locking hook section (31c), the locking piece accommodating sections comprise:

a first locking piece accommodating section (14) which corresponds to the narrow width locking hook section (31a), and which is able to accommodate the narrow width locking hook section (31a) and is not able to accommodate the intermediate width locking hook section (31b) or the broad width locking hook section (31c);

a second locking piece accommodating section (15) which corresponds to the intermediate width locking hook section, and which is able to accommodate the intermediate width locking hook section and the narrow width locking hook section and is not able to accommodate the broad width locking hook section; and third locking hook accommodating section (16a, 16b) which correspond to the broad width locking hook section, and which are able to accommodate the broad width locking hook section, the narrow width locking hook section and the intermediate width locking hook section, and wherein the first locking piece accommodating section (14) is disposed further towards a side of the one end or a side of the other end in the lengthwise direction of the other one of the lower rail and the upper rail than the second locking piece accommodating section (15) and the third locking piece accommodating section (16), and the second locking piece accommodating section (15) is disposed between the first locking piece accommodating section (14) and the third locking piece accommodating section (16) in the lengthwise direction of the other one of the lower rail and the upper rail.

According to the composition described above, in an unlocked state, if the seat is moved to the front side until the third locking piece which is disposed on the rearmost side, for example, is situated to the front side of the first locking piece accommodating section which is disposed on the frontmost side, and the seat is then moved rearwards, the third locking piece passes over the first locking piece accommodating section on the frontmost side, without entering therein, and the first locking piece which is disposed to the front side of the third locking piece subsequently enters the first locking piece accommodating section upon becoming aligned therewith. Moreover, in a substantially simultaneous fashion with this, the second locking piece becomes aligned with, and enters into, the second locking piece accommodating section which is adjacent to the first locking piece accommodating section.

Accordingly, when the first locking piece enters into and locks with the first locking piece accommodating section, the second locking piece is also able to enter into and lock with the second locking piece accommodating section which is adjacent to the first locking piece accommodating section.

Therefore, it is possible to reduce the risk of bending of the locking pieces or breakage of the locking piece accommodating sections when in a locked state, and a locked state provided with sufficient strength can be achieved at all times.

In a further mode, in the seat slide locking apparatus described above, a connecting hole (17) is formed to have a broader width than the second locking piece accommodating section (15) and to be able to accommodate the narrow width locking hook section (31a), the intermediate width locking hook section (31b) and the broad width locking hook section (31c) in the second locking piece accommodating section (15); and the connecting hole (17) is disposed between the second locking piece accommodating section (15) and the third locking piece accommodating section (16) so as to communicate with the second locking piece accommodating section (15).

According to this, when the first locking piece enters the first locking piece accommodating section, in substantially simultaneous fashion with this, a second locking piece enters a second locking piece accommodating section and a third locking piece is able to enter a connecting hole. Consequently, it is possible to raise the strength yet further in the locked state.

In a further mode, the seat slide locking apparatus described above further has:

a holding member (7) which fixes the plurality of locking pieces (3a, 3b, 3c) to the upper rail (2), wherein the first locking piece (3a), the second locking piece (3b) and the third locking piece (3c) each have substantially the same thickness;

the plurality of locking piece accommodating sections (14, 15, 16) are formed in the lower rail (1);

in the plurality of locking pieces held by the holding member (7), the first locking piece (3a) is held at a frontmost end of the upper rail (2), the third locking piece (3c) is held at a rearmost end of the upper rail (2), and at least one second locking piece (3b) is held between the first locking piece (3a) and the third locking piece (3c);

the locking piece accommodating section formed on a frontmost side of the lower rail (1) is the first locking piece accommodating section (14), the second locking piece accommodating section (15) is formed to the rear side of the first locking piece accommodating section (14), and the third locking piece accommodating section (16) is formed to the rear side of the second locking piece accommodating section (15); and when the first locking piece (3a) enters the first locking piece accommodating section (14), at least one of the following states arises:

(A) the second locking piece (3b) enters the second locking piece accommodating section (15), or (B) the third locking piece enters the third locking piece accommodating section (16).

In a further mode, the seat slide locking apparatus described above further has:

a holding member (7) which fixes the plurality of locking pieces (3a, 3b, 3c) to the upper rail (2), wherein the first locking piece (3a), the second locking piece (3b) and the third locking piece (3c) each have substantially the same thickness;

the plurality of locking piece accommodating sections (14, 15, 16) are formed in the lower rail (1);

in the plurality of locking pieces held by the holding member (7), the first locking piece (3a) is held at a frontmost end of the upper rail (2), the third locking piece (3c) is held at a rearmost end of the upper rail (2), and at least one second locking piece (3b) is held between the first locking piece (3a) and the third locking piece (3c);

the locking piece accommodating section formed on a frontmost side of the lower rail (1) is the first locking piece accommodating section (14), the second locking piece accommodating section (15) is formed to the rear side of the first locking piece accommodating section (14), and the third locking piece accommodating section (16) is formed to the rear side of the second locking piece accommodating section (15); and when the first locking piece (3a) enters the second locking piece accommodating section (15), at least one of the following states arises:

(A) the second locking piece (3b) enters at least one of the second locking piece accommodating section (15) and the third locking piece accommodating section (16), or (B) the third locking piece enters the third locking piece accommodating section (16).

Moreover, in a further mode, the seat slide locking apparatus described above further has: a holding member (7) which fixes the plurality of locking pieces (3a, 3b, 3c) to the upper rail (2), wherein the first locking piece (3a), the second locking piece (3b) and the third locking piece (3c) each have substantially the same thickness;

the plurality of locking piece accommodating sections (14, 15, 16) are formed in the lower rail (1);

in the plurality of locking pieces held by the holding member (7), the first locking piece (3a) is held at a rearmost end of the upper rail (2), the third locking piece (3c) is held at a frontmost end of the upper rail (2), and at least one second locking piece (3b) is held between the first locking piece (3a) and the third locking piece (3c);

the locking piece accommodating section formed on a rearmost side of the lower rail (1) is the first locking piece accommodating section (14), the second locking piece accommodating section (15) is formed to the front side of the first locking piece accommodating section (14), and the third locking piece accommodating section (16) is formed to the front side of the second locking piece accommodating section (15); and when the first locking piece (3a) enters the first locking piece accommodating section (14), at least one of the following states arises:

(A) the second locking piece (3b) enters the second locking piece accommodating section (15), or (B) the third locking piece enters the third locking piece accommodating section (16).

Moreover, in a further mode, the seat slide locking apparatus described above further has:

a holding member (7) which fixes the plurality of locking pieces (3a, 3b, 3c) to the upper rail (2), wherein the first locking piece (3a), the second locking piece (3b) and the third locking piece (3c) each have substantially the same thickness;

the plurality of locking piece accommodating sections (14, 15, 16) are formed in the lower rail (1);

in the plurality of locking pieces held by the holding member (7), the first locking piece (3a) is held at a rearmost end of the upper rail (2), the third locking piece (3c) is held at a frontmost end of the upper rail (2), and at least one second locking piece (3b) is held between the first locking piece (3a) and the third locking piece (3c);

the locking piece accommodating section formed on a rearmost side of the lower rail (1) is the first locking piece accommodating section (14), the second locking piece accommodating section (15) is formed to the front side of the first locking piece accommodating section (14), and the third locking piece accommodating section (16) is formed to the front side of the second locking piece accommodating section (15); and when the first locking piece (3a) enters the second locking piece accommodating section (15), at least one of the following states arises:

(A) the second locking piece (3b) enters at least one of the second locking piece accommodating section (15) and a third locking piece accommodating section (16), or (B) the third locking piece enters the third locking piece accommodating section (16).

This application is based on Japanese Patent Application Serial No. 2011-118947 filed in Japan Patent Office on May 27, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A seat slide locking apparatus, comprising:
a lower rail;
an upper rail which is movable along a lengthwise direction of the lower rail;
a plurality of locking pieces which are provided on one of the lower rail and the upper rail, and which have locking hook sections arranged in one row, with thickness directions thereof aligned in the lengthwise direction of the one of the lower rail and the upper rail; and
a plurality of locking piece accommodating sections which are provided in the other one of the lower rail and the upper rail and which accommodate the locking hook sections of the locking pieces, wherein
the plurality of locking pieces are constituted by pieces of a plurality of types having the locking hook sections of different widths and are arranged successively along the lengthwise direction of the one of the lower rail and the upper rail in order of increasing width of each of the locking hook section;
the plurality of locking piece accommodating sections are constituted by accommodating sections of a plurality of types having different widths arranged in order of increasing width thereof from one end side to the other end side in the lengthwise direction of the other one of the lower rail and the upper rail and formed so as to correspond to the widths of the respective locking hook sections; and
simultaneously with a locking piece, which has a locking hook section corresponding to a locking piece accommodating section of narrowest width, entering the locking piece accommodating section of narrowest width, a locking piece having a locking hook section corresponding to a locking piece accommodating section adjacent to the locking piece accommodating section of narrowest width is able to enter the adjacent locking piece accommodating section.

2. A seat slide, comprising:
a lower rail;
an upper rail that is movable along a lengthwise direction of the lower rail;
a plurality of locking pieces provided on one of the lower rail and the upper rail and having locking hook sections arranged in one row with thickness directions thereof aligned in the lengthwise direction of the one of the lower rail and the upper rail; and
a plurality of locking piece accommodating sections provided in the other one of the lower rail and the upper rail and that accommodate the locking hook sections of the locking pieces, wherein
the plurality of locking pieces are constituted by pieces of a plurality of types having the locking hook sections of different widths; and
the plurality of locking piece accommodating sections are constituted by accommodating sections of a plurality of types having different widths that correspond to the widths of the respective locking hook sections
the plurality of locking pieces comprise:
a first locking piece having a narrow width locking hook section;
a third locking piece having a broad width locking hook section of broader width than the narrow width locking hook section; and
a second locking piece disposed between the first locking piece and the third locking piece and having an intermediate width locking hook section of broader width than the narrow width locking hook section and narrower width than the broad width locking hook section,
the locking piece accommodating sections comprise:
a first locking piece accommodating section which corresponds to the narrow width locking hook section, and which is able to accommodate the narrow width locking hook section and is not able to accommodate the intermediate width locking hook section or the broad width locking hook section;
a second locking piece accommodating section which corresponds to the intermediate width locking hook section, and which is able to accommodate the intermediate width locking hook section and the narrow width locking hook section and is not able to accommodate the broad width locking hook section; and
third locking hook accommodating section which correspond to the broad width locking hook section, and which are able to accommodate the broad width locking hook section, the narrow width locking hook section and the intermediate width locking hook section, and wherein
the first locking piece accommodating section is disposed further towards a side of the one end or a side of the other end in the lengthwise direction of the other one of the lower rail and the upper rail than the second locking piece accommodating section and the third locking piece accommodating section, and
the second locking piece accommodating section is disposed between the first locking piece accommodating section and the third locking piece accommodating section in the lengthwise direction of the other one of the lower rail and the upper rail.

3. The seat slide locking apparatus according to claim 2, wherein
a connecting hole is formed in the second locking piece accommodating section to have a broader width than the second locking piece accommodating section and to be able to accommodate the narrow width locking hook section, the intermediate width locking hook section and the broad width locking hook section; and
the connecting hole is disposed between the second locking piece accommodating section and the third locking piece accommodating section so as to communicate with the second locking piece accommodating section.

4. The seat slide locking apparatus according to claim 2, further comprising:
a holding member which fixes the plurality of locking pieces to the upper rail, wherein
the first locking piece, the second locking piece and the third locking piece each have substantially the same thickness,
the plurality of locking piece accommodating sections are formed in the lower rail,
in the plurality of locking pieces held by the holding member, the first locking piece is held at a frontmost end of the upper rail, the third locking piece is held at a rearmost end of the upper rail, and at least one second locking piece is held between the first locking piece and the third locking piece, the locking piece accommodating section formed on a frontmost side of the lower rail is the first locking piece accommodating section, the second locking piece accommodating section is formed to the rear side of the first locking piece accommodating section, and the third locking piece accommodating section is formed to the rear side of the second locking piece accommodating section, and when the first locking piece enters the first locking piece accommodating section, at least one of the following states arises:

(A) the second locking piece enters the second locking piece accommodating section, or (B) the third locking piece enters the third locking piece accommodating section.

5. The seat slide locking apparatus according to claim 2, further comprising:

a holding member which fixes the plurality of locking pieces to the upper rail, wherein the first locking piece, the second locking piece and the third locking piece each have substantially the same thickness, the plurality of locking piece accommodating sections are formed in the lower rail, in the plurality of locking pieces held by the holding member, the first locking piece is held at a frontmost end of the upper rail, the third locking piece is held at a rearmost end of the upper rail, and at least one second locking piece is held between the first locking piece and the third locking piece, the locking piece accommodating section formed on a frontmost side of the lower rail is the first locking piece accommodating section, the second locking piece accommodating section is formed to the rear side of the first locking piece accommodating section, and the third locking piece accommodating section is formed to the rear side of the second locking piece accommodating section, and when the first locking piece enters the second locking piece accommodating section, at least one of the following states arises:

(A) the second locking piece enters at least one of the second locking piece accommodating section and the third locking piece accommodating section, or (B) the third locking piece enters the third locking piece accommodating section.

6. The seat slide locking apparatus according to claim 2, further comprising:

a holding member which fixes the plurality of locking pieces to the upper rail, wherein the first locking piece, the second locking piece and the third locking piece each have substantially the same thickness;

the plurality of locking piece accommodating sections are formed in the lower rail;

in the plurality of locking pieces held by the holding member, the first locking piece is held at a rearmost end of the upper rail, the third locking piece is held at a frontmost end of the upper rail, and at least one second locking piece is held between the first locking piece and the third locking piece;

the locking piece accommodating section formed on a rearmost side of the lower rail is the first locking piece accommodating section, the second locking piece accommodating section is formed to the front side of the first locking piece accommodating section, and the third locking piece accommodating section is formed to the front side of the second locking piece accommodating section; and when the first locking piece enters the first locking piece accommodating section, at least one of the following states arises:

(A) the second locking piece enters the second locking piece accommodating section, or (B) the third locking piece enters the third locking piece accommodating section.

7. The seat slide locking apparatus according to claim 2, further comprising:

a holding member which fixes the plurality of locking pieces to the upper rail, wherein the first locking piece, the second locking piece and the third locking piece each have substantially the same thickness, the plurality of locking piece accommodating sections are formed in the lower rail, in the plurality of locking pieces held by the holding member, the first locking piece is held at a rearmost end of the upper rail, the third locking piece is held at a frontmost end of the upper rail, and at least one second locking piece is held between the first locking piece and the third locking piece, the locking piece accommodating section formed on a rearmost side of the lower rail is the first locking piece accommodating section, the second locking piece accommodating section is formed to the front side of the first locking piece accommodating section, and the third locking piece accommodating section is formed to the front side of the second locking piece accommodating section; and when the first locking piece enters the second locking piece accommodating section, at least one of the following states arises:

(A) the second locking piece enters at least one of the second locking piece accommodating section and a third locking piece accommodating section, or (B) the third locking piece enters the third locking piece accommodating section.

\* \* \* \* \*